(12) United States Patent
Kobayashi et al.

(10) Patent No.: US 6,498,211 B2
(45) Date of Patent: Dec. 24, 2002

(54) VIBRATION DAMPING SILICONE COMPOSITION

(75) Inventors: Hideki Kobayashi, Chiba Prefecture (JP); Masayuki Hayashi, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/915,845

(22) Filed: Jul. 26, 2001

(65) Prior Publication Data

US 2002/0045701 A1 Apr. 18, 2002

(30) Foreign Application Priority Data

Aug. 31, 2000 (JP) ........................................ 2000-262108

(51) Int. Cl.⁷ .............................................. C08L 83/04
(52) U.S. Cl. ...................... 524/588; 524/425; 524/284; 524/394; 428/403
(58) Field of Search ................................. 524/588, 452, 524/284, 394; 428/403

(56) References Cited

U.S. PATENT DOCUMENTS 4,374,950 A * 2/1983 Shimizu

FOREIGN PATENT DOCUMENTS

JP 080277 3/2000

* cited by examiner

Primary Examiner—Robert Dawson
Assistant Examiner—Kuo-Liang Peng
(74) Attorney, Agent, or Firm—Jim L. DeCesare

(57) ABSTRACT

A vibration damping silicone composition of superior long term storage stability and vibration damping properties contains (A) a silicone oil, (B) a heavy calcium carbonate powder, (C) a light calcium carbonate powder, and (D) a fatty acid or a fatty acid derivative.

4 Claims, No Drawings

VIBRATION DAMPING SILICONE COMPOSITION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to a vibration damping silicone composition, more specifically a vibration damping silicone composition of superior storage stability and vibration damping properties.

BACKGROUND OF THE INVENTION

Silicone compositions containing silicone oils and fillers are vibration damping materials due to the low viscosity temperature dependency of the silicone oils and their large bulk compressibility. These compositions have been used for vibration damping members of precision equipment such as precision measurement devices, magnetic disks, magneto optical disks, other magnetic signal reading devices, compact disks, laser disks, and other optical signal reading devices. For example, a silicone composition prepared by mixing a silicone resin powder and a calcium carbonate powder with a silicone oil is described in Japanese Patent Application Publication No. 2000-080277. However, there exists a need for vibration damping silicone compositions that would possess superior vibration damping characteristics without using expensive silicone resin powders

BRIEF SUMMARY OF THE INVENTION

Therefore, it is an object of the invention to provide a vibration damping silicone composition having superior storage stability and vibration damping properties.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The invention is directed to vibration damping silicone compositions containing (A) 100 parts by weight of a silicone oil, (B) 20–250 parts by weight of a heavy calcium carbonate powder, (C) 10–100 parts by weight of a light calcium carbonate powder, and (D) 0.01–20 parts by weight of a fatty acid or a fatty acid derivative.

The silicone oil component (A) functions as the medium for dispersing micropowders of component (B) and component (C), and is typically an organopolysiloxane that is a liquid at room temperature. Groups bonded to silicon atoms in the organopolysiloxane are exemplified by monovalent hydrocarbon groups such as methyl, ethyl, and propyl, and other alkyl groups; vinyl, butenyl and other alkenyl groups; phenyl, tolyl and other aryl groups; and 3,3,3-trifluoropropyl and other halogenated alkyl groups. Hydroxyl groups, or methoxy, ethoxy and other alkoxy groups can be substituted for some of the hydrocarbon groups. Alkyl groups are most preferable, and methyl is particularly preferable because of the excellent storage stability of such compositions.

The molecular structure of the organopolysiloxane can be linear, partially branched linear, branched, or cyclic, but a linear structure is preferred. The kinematic viscosity of component (A) at 25° C. should be 100–1,000,000 $mm^2/s$, preferably 500–500,000 $mm^2/s$. When the kinematic viscosity at 25° C. is less than 100 $mm^2/s$, component (B) and component (C) are difficult to maintain in a uniformly dispersed state in component (A); whereas when it exceeds 1,000,000 $mm^2/s$, the handling properties deteriorate, and component (B) and component (C) become difficult to disperse in component (A). Component (A) is exemplified by dimethylpolysiloxanes end blocked by trimethylsiloxy groups, dimethylpolysiloxanes end blocked by dimethylvinylsiloxy groups, dimethylpolysiloxanes end blocked with silanol groups, and copolymers of methylphenylsiloxane and dimethylsiloxane end blocked by trimethylsiloxy groups.

To increase the long term storage stability and reliability of component (A), it is preferred that it contain less than 1,000 ppm of organosiloxane oligomers with not more than 20 silicon atoms. Silicone oils with reduced amounts of such oligomers can be obtained by subjecting silicone oils with oligomer content of 10,000–40,000 ppm to stripping after ordinary equilibrium polymerization to reduce the content of oligomer. For example, such silicone oils can be produced by processes in which oligomers are removed by (i) a thin film evaporator at 270–350° C. and 0.1–15 mmHg, (ii) processes in which oligomers are extracted and removed with alcohols such as methanol, ethanol, propanol, and butanol, or ketones such as acetone and methylethylketone, or (iii) by reprecipitation methods.

Heavy calcium carbonate powder component (B) is the filler used for the vibration damping silicone composition. It is also referred to in the art as crushed calcium carbonate, and is typically produced by grading crushed white lime. This type of heavy calcium carbonate powder is commercially available under names such as WHITONE P-30 and WHITONE P-305, by Toyo Fine Chemicals, Co., Ltd.; and NANOX# 30 by Maruo Calcium Co., Ltd. Heavy calcium carbonate powder with surfaces treated with a fatty acid or a fatty acid derivative are particularly preferred because of the superior stability of dispersions of component (B) in component (A). Some examples of suitable fatty acids which can be used for this surface treatment are caprylic acid, lauric acid, myristic acid, palmitic acid, stearic acid, oleic acid, linoleic acid, cerotic acid, behenic acid, elaidic acid, and arachidic acid. Fatty acid derivatives which can be used are exemplified by alkali metal salts, alkaline earth metal salts, or metal salts of such fatty acids.

The average particle size of the heavy calcium carbonate powder is preferably 0.01–300 µm, and more preferably 0.01–100 µm. The amount of component (B) used in the composition is 20–250 parts by weight, preferably 50–200 parts by weight, per 100 parts by weight of component (A). When there is less than 20 parts by weight of component (B), the vibration damping characteristics of the composition of the invention deteriorates, and when the amount exceeds 250 parts by weight, its operating properties deteriorate.

Light calcium carbonate powder component (C) is another filler which is used with component (B). Light calcium carbonate powder is referred to in the art as precipitated calcium carbonate, and is typically produced by dehydrating and drying a light calcium carbonate slurry obtained by reacting dense limestone with carbon dioxide gas. Again, the surface of the powder component (C) can be treated with any of the fatty acids or fatty acid derivatives noted above.

These types of light calcium carbonate powder are commercially available under names such as HAKUENKA CC from Shiraishi Calcium Co., Ltd., and CALFINE 200 from Maruo Calcium Co., Ltd. The average particle size of component (C) is preferably 0.01 μm–300 μm, more preferably 0.01–100 μm. The amount of component (C) used in the composition is 10–100 parts by weight, preferably, 15–80 parts by weight, per 100 parts by weight of component (A). When less than 10 parts by weight of component (C) is used, the vibration damping properties of the composition of the invention deteriorate, and when the amount exceeds 100 parts by weight, its operating properties deteriorate.

The total amount of the heavy and light calcium carbonate powders components (B) and (C) preferably exceeds 150 parts by weight, more preferably 170 parts by weight, per 100 parts by weight of component (A).

Fatty acid or fatty acid derivative component (D) is present to improve the storage stability and dispersibility of the vibration damping silicone composition of the invention. Component (D) can comprise a fatty acid such as caprylic acid, lauric acid, myristic acid, palmitic acid, stearic acid, oleic acid, linoleic acid, cerotic acid, behenic acid, elaidic acid, and arachidic acid. Component (D) can also comprise a fatty acid derivative such as an alkali metal salt, an alkaline earth metal salt, or a metal salt of such fatty acids. Fatty acids with 6–31 carbon atoms or their derivatives are preferred. One example of a preferred fatty acid derivative is zinc stearate. The amount of component (D) used in the composition is 0.01–20 parts by weight, preferably 0.1–15 parts by weight, per 100 parts by weight of component (A). When less than 0.01 parts by weight of component (D) is used, the storage stability of the composition of the invention deteriorates, and when the amount exceeds 20 parts by weight, its vibration damping characteristics deteriorate.

While silicone compositions according to the invention contain components (A)–(D), inorganic powders other than calcium carbonate powders (B) and (C), can be included as an additional component. Some examples of suitable inorganic powders which can be used include silica micropowder, glass micropowder, clay, bentonite, diatomaceous earth, quartz powder, talc, titanium oxide powder, tin oxide powder, aluminum oxide powder, and iron oxide powder. In addition, there can be included components such as anti-oxidants, rust preventatives, flame retardants, pigments, and dyes, provided the component does not impair the function of the composition of the invention.

Silicone compositions of the invention are produced by uniformly mixing components (A)–(D). This can be accomplished with a ball mill, a vibrating mill, a kneader mixer, a screw extruder, a paddle mixer, a ribbon mixer, a Banbury mixer, a Ross mixer, a Henschel mixer, a flow jet mixer, a Hubbard mixer, or a roll mixer. The composition can be heated during the mixing process, preferably at a temperature of 30–200° C.

Silicone compositions according to the invention exhibit superior storage stability and vibration damping properties, and are characterized by low temperature dependence. The silicone compositions can be used in shock absorbers by filling elastic containers such as rubber bags or rubber cylinders with the composition. The silicone compositions are particularly suitable for shock absorbers used in compact disk players, compact disk changers, mini-disk players, and car navigation devices.

EXAMPLES

The following application examples illustrate the invention in more detail. In these application examples, the kinematic viscosity is the value measured at 25° C. The vibration damping characteristics of the silicone compositions were evaluated by measuring the complex elastic modulus (G*) and the loss tangent coefficient (tan δ). The G* and tan δ were measured by the plate method using a Dynamic Analyzer Model RDA-700 manufactured by Rheometrix. The measurement conditions were (i) a plate diameter of 20 mm, (ii) a frequency of 10 Hz, (iii) a strain of 20 percent, and (iv) a sample thickness of one mm.

Application Example 1

In this example, component (C) was treated with a fatty acid. A silicone composition was prepared by adding to a mixer 100 parts by weight of a dimethylpolysiloxane with a kinematic viscosity of 100,000 mm$^2$/s having both terminal ends blocked by trimethylsiloxy groups, 157 parts by weight of a heavy calcium carbonate powder with an average particle size of 4.3 μm, 28 parts by weight of a light calcium carbonate powder with a BET specific surface area of 18 m$^2$/g and a BET specific surface area derived average particle size of 0.12 μm whose surface was treated with stearic acid, and 0.5 parts by weight of zinc stearate. These components were kneaded in the mixer at 150 rpm for one hour while material was scraped from the mixer wall every 30 minutes. The vibration damping characteristics of the silicone composition were measured and are shown in Table 1.

The composition was found to possess excellent dispersion stability and storage stability. This determination was made by placing the silicone composition in a glass vial and allowing it to stand for one week. No difference between the surface portion and the bottom portion of the composition was detected when the external appearance of the surface portion and the bottom portion was visually compared. When the silicone composition was allowed to stand for two months and its vibration damping properties were measured, there were no changes in terms of the loss tangent coefficient (tan δ). The change in the complex elastic modulus (G*) was +9 percent, but no significant change in terms of vibration damping was observed. Thus, the silicone composition had superior long term storage stability.

Application Example 2

In this example, component (B) was treated with a fatty acid. A silicone composition was prepared by adding to a mixer 100 parts by weight of a dimethylpolysiloxane with a kinematic viscosity of 100,000 mm$^2$/s having both terminal ends blocked by trimethylsiloxy groups, 157 parts by weight of a heavy calcium carbonate powder with an average particle size of 4 μm whose surface was treated with stearic acid, 15 parts by weight of a light calcium carbonate powder with an average particle size of 0.12 μm, and 0.5 parts by weight of zinc stearate. These components were kneaded in the mixer at 150 rpm for one hour while material was scraped from the mixer wall every 30 minutes. The vibration damping characteristics of the silicone composition were measured and are shown in Table 1.

The composition was found to possess excellent dispersion stability and storage stability. This determination was made by placing the silicone composition in a glass vial and allowing it to stand for one week. No difference between the surface portion and the bottom portion of the composition was detected when the external appearance of the surface portion and the bottom portion was visually compared, after the silicone composition was allowed to stand for one week.

Application Example 3

In this example, components (B) and (C) were treated with a fatty acid. A silicone composition was prepared by adding to a mixer 100 parts by weight of a dimethylpolysiloxane with a kinematic viscosity of 100,000 mm$^2$/s having both terminal ends blocked by trimethylsiloxy groups, 157 parts by weight of a heavy calcium carbonate powder with an average particle size of 4.3 μm whose surface was treated with stearic acid, 28 parts by weight of a light calcium carbonate powder with a BET specific surface area of 18 m$^2$/g and a BET specific surface area derived average particle size of 0.12 μm whose surface was treated with stearic acid, and 1.0 parts by weight of zinc stearate. These components were kneaded in the mixer at 150 rpm for one hour while material was scraped from the mixer wall every 30 minutes. The vibration damping characteristics of the silicone composition were measured and are shown in Table 1.

The composition was found to possess excellent dispersion stability and storage stability. This determination was made by placing the silicone composition in a glass vial and allowing it to stand for one week. No difference between the surface portion and the bottom portion of the composition was detected when the external appearance of the surface portion and the bottom portion was visually compared, after the silicone composition was allowed to stand for one week.

Application Example 4

In this example, component (C) was treated with a fatty acid. A silicone composition was prepared by adding to a mixer 100 parts by weight of a dimethylpolysiloxane with a kinematic viscosity of 100,000 mm$^2$/s having both terminal ends blocked by trimethylsiloxy groups, 157 parts by weight of a heavy calcium carbonate powder with an average particle size of 4.3 μm, 28 parts by weight of a light calcium carbonate powder with a BET specific surface area of 18 m$^2$/g and a BET specific surface area derived average particle size of 0.12 μm whose surface was treated with stearic acid, and 2.0 parts by weight of zinc stearate. The dimethylpolysiloxane used in this example contained less than 500 ppm of organosiloxane oligomers with not more than 20 silicon atoms, as determined by gas chromatography. These components were kneaded in the mixer at 150 rpm for one hour while material was scraped from the mixer wall every 30 minutes. The vibration damping characteristics of the silicone composition were measured and are shown in Table 1.

The composition was found to possess excellent dispersion stability and storage stability. This determination was made by placing the silicone composition in a glass vial and allowing it to stand for one week. No difference between the surface portion and the bottom portion of the composition was detected when the external appearance of the surface portion and the bottom portion was visually compared, after the silicone composition was allowed to stand for one week.

Comparative Example 1

A comparative silicone composition containing less than the required amounts of components (B) and (C), was prepared by adding to a mixer 100 parts by weight of a dimethylpolysiloxane with a kinematic viscosity of 100,000 mm$^2$/s having both terminal ends blocked by trimethylsiloxy groups, 5 parts by weight of a heavy calcium carbonate powder with a BET specific surface area of 3.4 m$^2$/g and an average particle size of 4.3 μm, 5 parts by weight of a light calcium carbonate powder with a BET specific surface area of 18 m$^2$/g and a BET specific surface area derived average particle size of 0.12 μm whose surface was treated with stearic acid, and 0.5 parts by weight of zinc stearate. These components were kneaded in the mixer at 150 rpm for one hour while material was scraped from the mixer wall every 30 minutes.

This comparative silicone composition was placed in a glass vial and allowed to stand for one week. The external appearance of its surface portion and its bottom portion were compared. It was found that there was very little filler in the surface portion. In addition, the silicone oil had risen to the surface, resulting in a difference in appearance between the surface and bottom portions. This comparative silicone composition, therefore, had insufficient dispersion and storage stability.

Comparative Example 2

A comparative silicone composition in which component (D) had been omitted, was prepared by adding to a mixer 100 parts by weight of a dimethylpolysiloxane with a kinematic viscosity of 100,000 mm$^2$/s having both terminal ends blocked by trimethylsiloxy groups, 157 parts by weight of a heavy calcium carbonate powder with a BET specific surface area of 3.4 m$^2$/g and an average particle size of 4.3 μm, and 28 parts by weight of a light calcium carbonate powder with a BET specific surface area of 18 m$^2$/g and a BET specific surface area derived average particle size of 0.12 μm whose surface was treated with stearic acid. These components were kneaded in the mixer at 150 rpm for one hour while material was scraped from the mixer wall every 30 minutes.

The comparative silicone composition was allowed to stand for two months. The vibration damping characteristics at 25° C. of the comparative silicone composition were then measured. It was found that the rate of change in complex elastic modulus (G*) had exceeded +20 percent, indicating that a considerable change in vibration damping characteristics of the comparative composition had occurred over time.

TABLE 1

| | G* 25° C. | tan δ 25° C. | G* change rate | | tan δ change rate | |
| --- | --- | --- | --- | --- | --- | --- |
| | | | −20/ 25° C. | 60/ 25° C. | −20/ 25° C. | 60/ 25° C. |
| Application Example 1 | 31800 | 2.83 | 1.30 | 0.97 | 0.65 | 1.06 |
| Application Example 2 | 31000 | 2.88 | 1.31 | 0.96 | 0.64 | 1.07 |
| Application Example 3 | 30000 | 3.0 | 1.35 | 0.94 | 0.60 | 1.10 |
| Application Example 4 | 28200 | 3.1 | 1.33 | 0.97 | 0.61 | 1.07 |

Because vibration damping silicone compositions according to the invention contain certain specified amounts of the four components (A)–(D), in particular two kinds of calcium carbonate powders as fillers, and contain fatty acid or fatty acid derivatives, such compositions possess superior long term storage stability and vibration damping properties.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A vibration damping silicone composition comprising (A) 100 parts by weight of a silicone oil, (B) 20–250 parts by weight of a heavy calcium carbonate powder, (C) 10–100 parts by weight of a light calcium carbonate powder, and (D) 0.01–20 parts by weight of a fatty acid or a fatty acid derivative.

2. A composition according to claim 1 in which the heavy calcium carbonate powder is crushed calcium carbonate, and the light calcium carbonate powder is precipitated calcium carbonate.

3. A composition according to claim 2 in which the surfaces of component (B), component (C), or components (B) and (C), are pretreated with a fatty acid or fatty acid derivative.

4. A composition according to claim 3 in which the total amount of component (B) and component (C) exceeds 150 parts by weight of the composition per 100 parts by weight of component (A).

* * * * *